United States Patent
Gerdes et al.

(10) Patent No.: US 7,594,436 B2
(45) Date of Patent: Sep. 29, 2009

(54) METHOD FOR DETERMINING AN IMBALANCE CONDITION OF A ROTATING BODY

(75) Inventors: Michael D. Gerdes, St. Peters, MO (US); Michael W. Douglas, St. Peters, MO (US); Joel Clasquin, Edwardsville, IL (US); William B. Feero, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 325 days.

(21) Appl. No.: 11/127,386

(22) Filed: May 12, 2005

(65) Prior Publication Data

US 2005/0210976 A1  Sep. 29, 2005

Related U.S. Application Data

(63) Continuation-in-part of application No. 10/648,165, filed on Aug. 26, 2003, now Pat. No. 6,952,964, which is a continuation-in-part of application No. 10/455,623, filed on Jun. 5, 2003, now abandoned.

(51) Int. Cl.
*G01M 1/00* (2006.01)
(52) U.S. Cl. .................................................. 73/459
(58) Field of Classification Search .................. 73/458, 73/459, 468, 462
See application file for complete search history.

(56) References Cited

U.S. PATENT DOCUMENTS

| | | | |
|---|---|---|---|
| 3,782,217 A * | 1/1974 | Wortley | 73/457 |
| 4,267,730 A | 5/1981 | Curchod et al. | 73/462 |
| 4,773,019 A | 9/1988 | Martin et al. | 700/279 |
| 4,854,168 A | 8/1989 | Himmler | 73/459 |
| 4,891,981 A | 1/1990 | Schonfeld | 73/460 |
| 5,008,826 A * | 4/1991 | Staudinger et al. | 701/124 |
| 5,046,361 A * | 9/1991 | Sandstrom | 73/460 |
| 5,171,067 A | 12/1992 | Kawabe et al. | 301/5.22 |
| 5,237,505 A | 8/1993 | Beebe | 73/459 |
| 5,343,408 A | 8/1994 | Chen et al. | 700/279 |
| 5,365,786 A * | 11/1994 | Douglas | 73/462 |
| 5,396,436 A * | 3/1995 | Parker et al. | 700/279 |
| 5,435,183 A * | 7/1995 | Uwe | 73/462 |
| 5,547,448 A | 8/1996 | Robertson | 492/16 |
| 5,549,019 A | 8/1996 | Cattani | 74/570.2 |
| 5,877,420 A | 3/1999 | Moradi et al. | 73/462 |
| 5,915,274 A | 6/1999 | Douglas | 73/462 |
| 6,122,957 A * | 9/2000 | Bux et al. | 73/66 |
| 6,481,282 B2 | 11/2002 | Douglas et al. | 73/461 |
| 6,484,574 B1 | 11/2002 | Douglas et al. | 73/462 |
| 6,581,444 B2 | 6/2003 | Bal | 73/66 |

(Continued)

OTHER PUBLICATIONS

Heinz E. Mueller, "Tolerances for Balancing", American Machinist, pp. 99, 101, Feb. 14, 1966.

(Continued)

*Primary Examiner*—Hezron Williams
*Assistant Examiner*—Tamiko D Bellamy
(74) *Attorney, Agent, or Firm*—Polster, Lieder, Woodruff & Lucchesi, L.C.

(57) ABSTRACT

A method for measuring imbalance forces in a rotating body, and for determining if an application of imbalance correction weights is required to compensate for the measured imbalance forces.

28 Claims, 11 Drawing Sheets

U.S. PATENT DOCUMENTS 6,950,763 B1     9/2005     Bechhoefer .................. 702/56
2002/0000121 A1*   1/2002     Carter et al. .................. 73/459

OTHER PUBLICATIONS

"Balance Quality Requirements of Rigid Rotors", IRD Balancing, Product Literature Form No. E11023-00, dated Jan. 2000. 12 Pages.
"In-Place Balancing of Rotating Machinery", IRD Mechanalysis, Inc., Columbus, Ohio, 1975. Form No. TP105, 22 Pages.
International Standard ISO-1925, "Mechanical vibration—Balancing—Vocabulary", Fourth Edition, Apr. 1, 2001. 52 Pages.
International Standard ISO 1940-1, "Mechanical vibration—Balance quality requirements for rotors in a constant (rigid) state—Part 1: Specification and verification of balance tolerances", Second Edition, Aug. 15, 2003. 36 pages.
International Standard ISO 1940-2, "Mechanical vibration—Balance quality requirements for rotors in a constant (rigid) state—Part 2: Balance errors", First Edition, Jun. 15, 1997. 20 pages.
John Bean Company, "7 Series Premium Digital Wheel Balancers—Operation Guide", Form No. 5172-4, Fifth Print, Sep. 1997. 23 Pages.
Luigi Buzzi, Dott. Ing., "Wheel Balancing", translation edit by P.F. Kercher LL.B., Booklet No. 18, CEMB S.p.A, Italy, Mar. 1987. 47 Pages.

* cited by examiner

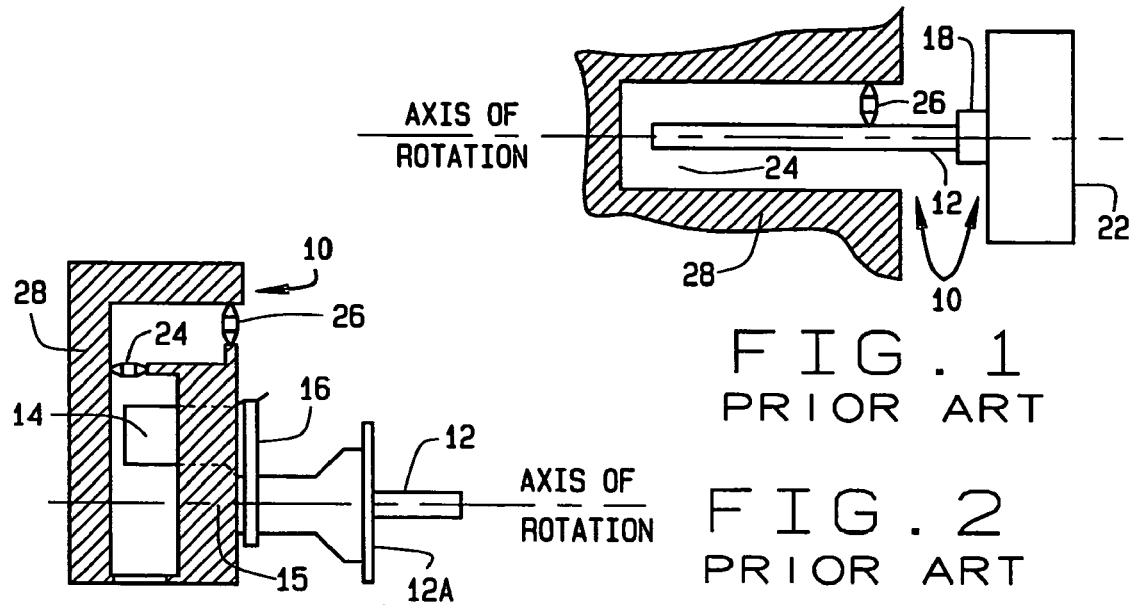
FIG. 1
PRIOR ART
FIG. 2
PRIOR ART
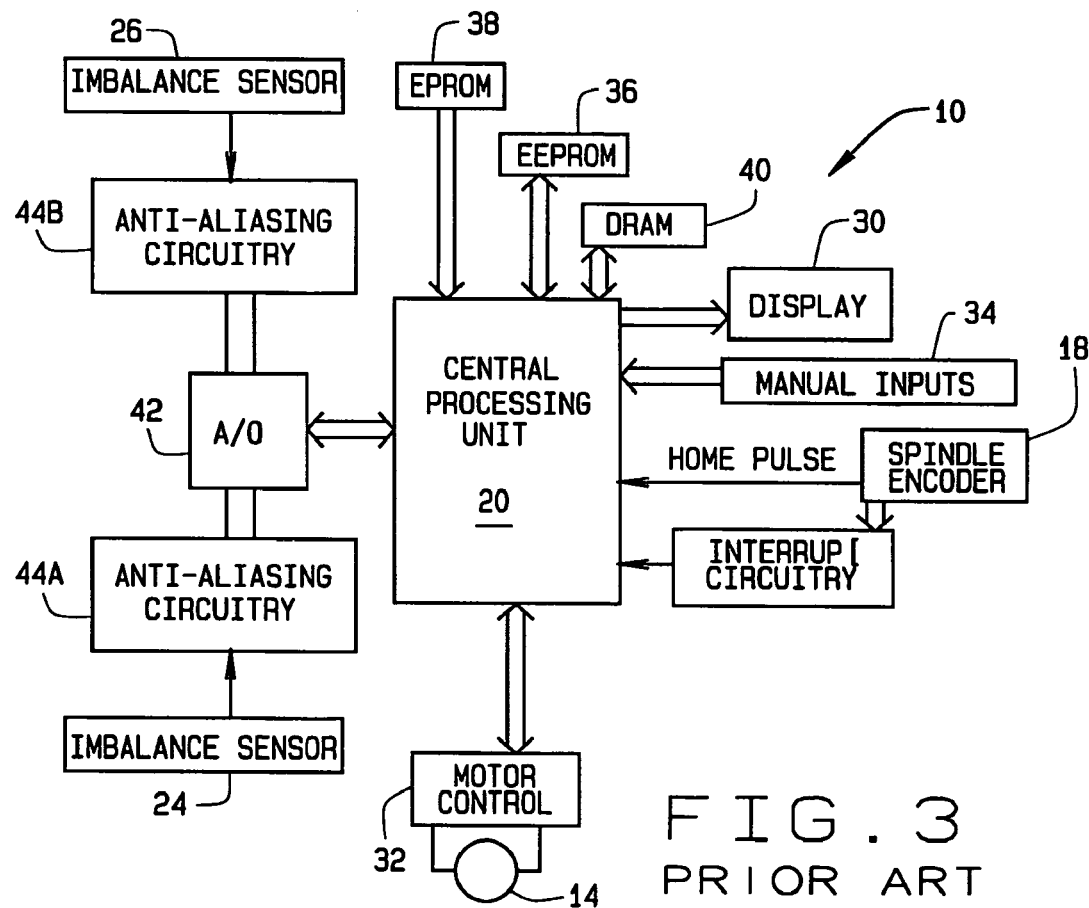
FIG. 3
PRIOR ART

METHOD FOR DETERMINING AN IMBALANCE CONDITION OF A ROTATING BODY

CROSS-REFERENCE TO RELATED APPLICATIONS

The present application is a continuation-in-part of, and claims priority from, U.S. patent application Ser. No. 10/648,165 filed on Aug. 26, 2003, now U.S. Pat. No. 6,952,964, which in turn is a continuation-in-part of U.S. patent application Ser. No. 10/455,623 filed on Jun. 5, 2003.

STATEMENT REGARDING FEDERALLY SPONSORED RESEARCH

Not Applicable.

BACKGROUND OF THE INVENTION

The present invention relates generally to automotive service equipment designed to measure imbalance in a vehicle wheel assembly, and in particular, to an improved wheel balancer system configured to adjust an imbalance correction threshold level for wheels mounted to the wheel balancer system.

Wheel balancer systems are designed to determine characteristics of a rotating body such as a wheel assembly consisting of a wheel rim and a pneumatic tire, or of a wheel rim alone. The determined characteristics include, but are not limited to static imbalances (i.e., "shake" forces), dynamic imbalances (i.e., couple or "shimmy" forces), lateral forces, radial forces and runout parameters. Determination of some of these characteristics result from direct measurements, while others are obtained from an analysis of the mechanical vibrations caused by rotational movement of the rotating body. The mechanical vibrations are measured as motions, forces, or pressures by means of transducers mounted in the wheel balancer system, which are configured to convert the mechanical vibrations into electrical signals.

Additionally, it is important to provide an operator with information about whether or not there is a need to correct a detected imbalance in the wheel rim or wheel assembly, or if the detected imbalance is sufficiently small so as to have a negligible effect on vehicle performance and handling. Currently, wheel rim sizes in the U.S. market range from 13.0 inches in diameter up to and including the present DOT limit of 24.0 inches in diameter. It is anticipated that wheel rim sizes will increase to 26.0 inches in diameter in the near future, with a corresponding increase in associated tire sizes. A problem presented by the continued increase in wheel rim and wheel assembly sizes is the effect of a fixed imbalance correction weight threshold level.

Due to the limited size increments in which imbalance correction weights are available, conventional balancer systems are configured to display as zero any required imbalance correction weight values below a threshold. Typically the predetermined threshold is 0.29 oz., and is selected to be slightly greater than the smallest imbalance correction weight increment, regardless of the size of the wheel rim or wheel assembly. This can result in an operator "chasing" weights on a small or narrow wheel due to the significant effect of the threshold level on imbalances, and a poor balance on larger diameter wheels due to a reduced effectiveness of the threshold level. One solution is shown in U.S. Pat. No. 6,484,574 to Douglas, in which a balancer is configured to select the best weight plane locations from data acquired by scanning the rim profile. This is an advantageous method, but it is not economical for all balancers to have this feature.

Clearly, it would be further advantageous to provide a wheel balancer system with a method for determining an imbalance threshold level which is independent of the dimensions of the wheel assembly undergoing balancing or the incremental size of the imbalance correction weight employed, and which optionally provides an operator with a scaled visual indication of any imbalances present relative to the determined imbalance threshold level.

BRIEF SUMMARY OF THE INVENTION

Briefly stated, an aspect of the present invention provides a method of balancing a rotating body includes the step of utilizing a imbalance force limit to identify a static imbalance threshold beyond which imbalance correction weights will be applied, and utilizing a imbalance moment limit to identify a dynamic imbalance threshold beyond which imbalance correction weights will be applied.

An alternate aspect of the present invention provides a method of balancing a rotating body includes the steps of determining at least one imbalance characteristics of the rotating body and providing a scaled visual display of any imbalance forces present in the rotating body prior to, or following, application of an imbalance correction weight.

In an alternate embodiment, the present invention provides a method for determining a variable imbalance correction weight threshold based on a comparison of the desired imbalance correction weight plane dimensions for a rotating body with a set of imbalance correction weight plane reference dimensions. The variable imbalance correction weight thresholds for a rotating body are computed as a function of the change in diameter and plane separation for the desired imbalance correction weight planes from a set of reference dimensions.

An alternate aspect of the present invention provides a method for determining when a single imbalance correction weight may be utilized to reduce static and dynamic imbalance in a rotating body to below reference thresholds. Following a determination that an imbalance force present in a rotating body exceed a reference threshold, imbalance correction weight placement planes associated with the rotating body are identified. The imbalance correction weight amounts and placement locations within each identified imbalance correction weight placement planes are identified. Residual imbalance forces which will remain in the rotating body are predicted for the application of a single static imbalance correction weight in each of the identified imbalance correction weight placement planes. The application of a single static imbalance correction weight which will result in a predicted residual imbalance force in the rotating body below a reference threshold is then identified to an operator.

An alternate aspect of the present invention provides a method for determining if the imbalance forces associated with a vehicle wheel are within acceptable limits by initially measuring at least one imbalance force associated with the vehicle wheel. Imbalance correction weight amounts are then calculated utilizing the measured imbalance force and a set of dimensions associated with a reference vehicle wheel. The calculated imbalance correction weight amount is compared to an imbalance correction weight threshold associated with the reference wheel, and the vehicle wheel is identified as acceptable if the calculated imbalance correction weight amount is less than the threshold.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a diagrammatic view illustrating a generic wheel balancer suitable for use with the present invention;

FIG. 2 is a simplified top plan view illustrating an alternate generic wheel balancer suitable for use with the present invention;

FIG. 3 is a block diagram illustrating various parts of a generic wheel balancer of FIG. 1 or FIG. 2;

Corresponding reference numerals indicate corresponding parts throughout the several figures of the drawings.

DESCRIPTION OF THE PREFERRED EMBODIMENT

Figure 4:
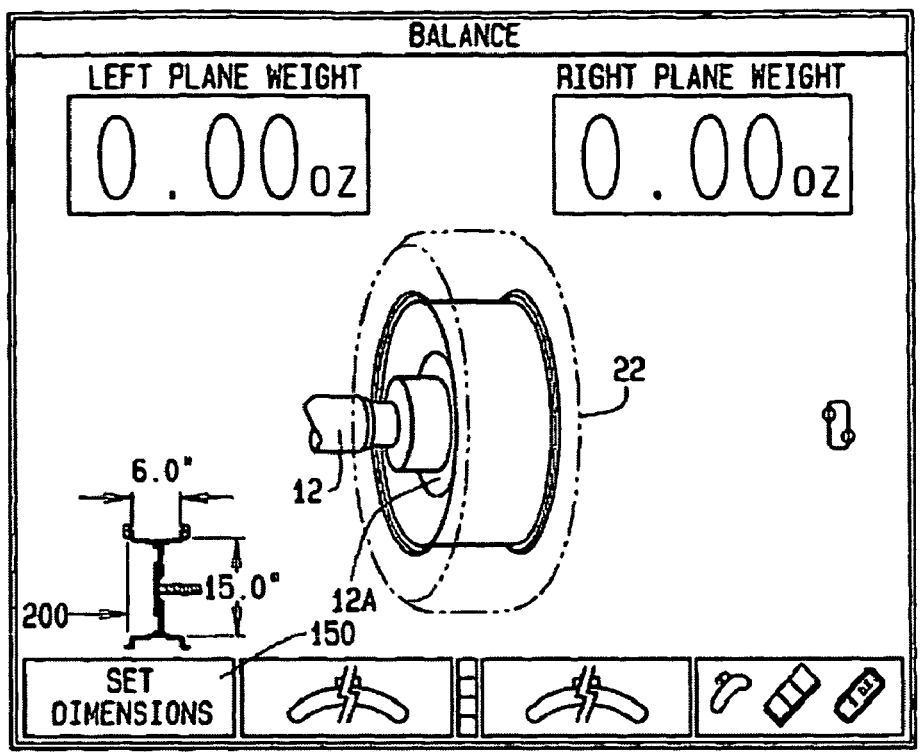
FIG. 4 is a representation of a prior art balancer display indicating no required weight placement for a rotating body of specific dimensions.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Turning to the drawings, FIG. 1 illustrates, in simplified form, the mechanical aspects of a wheel balancer 10 suitable for the present invention. The particular balancer shown is illustrative only, since the particular devices and structures used to obtain dimensional and imbalance information related to a rotating body could be readily changed without changing the present invention.

Balancer 10 includes a rotatable shaft or spindle 12 driven by a suitable drive mechanism such as a motor 14 and drive belt 16. Mounted on spindle 12 is a conventional optical shaft encoder 18 which provides speed and rotational position information to the central processing unit 20, shown in FIG. 3.

During the operation of wheel balancing, at the end of the spindle 12, a rotating body 22 under test is removably mounted for rotation with the spindle hub 12A. The rotating body 22 may comprise a wheel rim, or a wheel assembly consisting of a wheel rim and a tire mounted thereon. To determine the rotating body imbalance, the balancer includes at least a pair of imbalance force sensors 24 and 26, such as piezoelectric sensors or strain gauges, coupled to the spindle 12 and mounted on the balancer base 28.

Turning to FIG. 2, it can be seen that the actual construction of the mechanical aspects of the balancer 10 can take a variety of forms. For example, the spindle 12 can include a hub 12A against which the rotating body 22 abuts during the balancing procedure.

When a rotating body 22 is unbalanced, it vibrates in a periodic manner as it is rotated, and these vibrations are transmitted to the spindle 12. The imbalance sensors 22 and 24 are responsive to these vibrations in the spindle 12, and generate a pair of analog electrical signals corresponding to the phase and magnitude of the vibrations at the particular sensor locations. These analog signals are input to the circuitry of FIG. 3, described below, which determines the required magnitudes and positions of correction weights necessary to correct the imbalance.

Turning to FIG. 3, wheel balancer 10 includes not only the imbalance sensors 22 and 24, and spindle encoder 18, but also the central processing unit 20 (such as a microprocessor, digital signal processor, or graphics signal processor). the central processing unit 23 performs signal processing on the output signals from the imbalance sensors 22 and 24 to determine an imbalance in the rotating body. In addition, the central processing unit 20 is connected to and controls a display 30 which provides information to an operator, control motor 14 through associated motor control circuits 32, and keeps track of the spindle rotation position with encoder 18.

Balancer 11 further includes one or more manual inputs 34, such as a keyboard, control knobs, or selector switches, which are connected to the central processing unit 20. The central processing unit 20 has sufficient capacity to control, via software, all the operations of the balancer 10 in addition to controlling the display 30. The central processing unit 20 is connected to a memory such as an EEPROM memory 36, EPROM program memory 38, and a dynamic RAM (DRAM) memory 40. The EEPROM memory 36 is used to store non-volatile information, such as calibration data, while the central processing unit 20 uses the DRAM 40 for storing temporary data.

The central processing unit 20 is also connected to an analog-to-digital converter 42. The signals from the imbalance sensors 22 and 24 are supplied through anti-aliasing circuitry 44A and 44B (if needed) to the analog-to-digital converter 42.

The operation of the various components described above is fully set forth in U.S. Pat. No. 5,396,436, the disclosure of which is incorporated herein by reference. It should be understood that the above description is included for completeness only, and that various other circuits could be used instead.

Once a rotating body 22 is accurately centered on the balancer spindle 12, the balancer 10 can begin the process of measuring one or more imbalance parameters of the rotating body 22, and providing the operator with one or more suggested imbalance correction weight magnitudes and placement locations. Imbalance correction weight magnitudes and placement locations are calculated and displayed to an operator on a screen or numerical readout 30. Due to the limited size increments in which imbalance correction weights are usually available, conventional balancer systems are configured to display to the operator a zero value for any imbalance which would require the installation of an imbalance correction weight amount which is below a threshold.

Typically the threshold is selected to be slightly greater than the smallest imbalance correction weight increment, regardless of the size of the wheel rim or wheel assembly. For a system adapted to use imbalance correction weights having 0.25 oz. increments, an exemplary threshold limit is 0.29 oz. of imbalance. This can result in an operator "chasing" weights on a small or narrow wheel due to the insignificant effect of the correction weight on imbalances, and a poor balance on larger diameter wheels.

Figure 5:
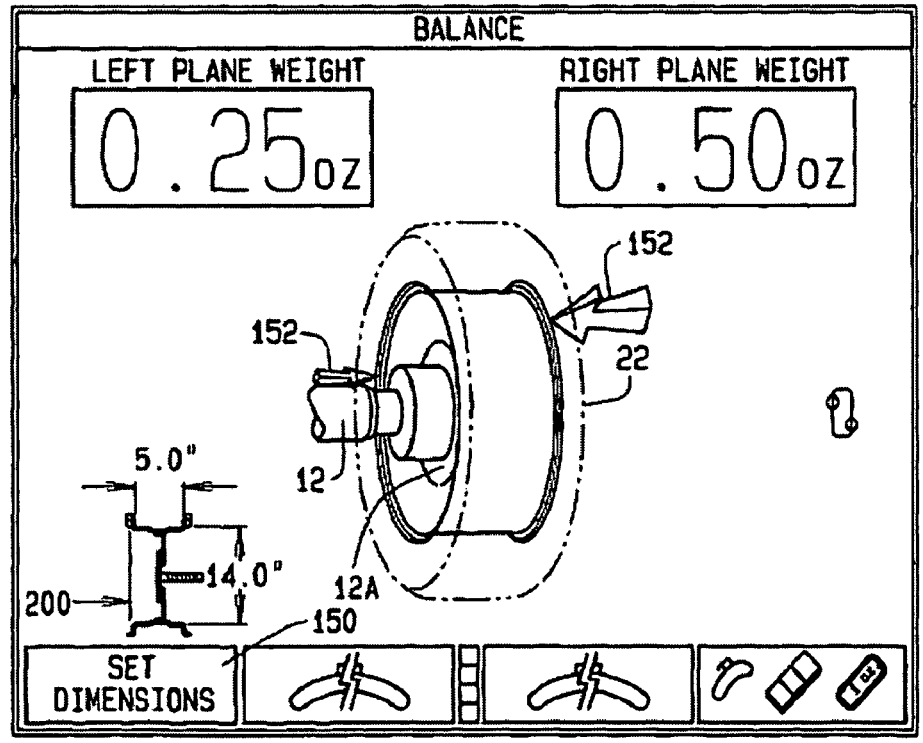
FIG. 5 is a representation of a prior art balancer display similar to FIG. 4, indicating a required weight placement for the rotating body with smaller diameter dimensions but having the same imbalance.

For example, as shown in FIG. 4, a wheel having a 6.0 inch axial width, and a 15.0 inch diameter might require imbalance weights below the weight threshold, resulting in the balancer displaying to an operator that no imbalance correction weights are required for either the left or right imbalance correction planes. However, as shown in FIG. 5, if the dimensions of the wheel are manually changed by the operator using the "SET DIMENSIONS" button 150 to indicate a 5.0 inch axial width and a 14.0 inch diameter, without re-measuring the wheel imbalance, larger weights are displayed to correct the imbalance, which exceed the weight threshold level. As a result, a conventional balancer would now direct an operator to install weights in the left and right imbalance correction planes (as indicated by arrows 152) despite the fact that the amount of the imbalance is unchanged.

Figure 6:
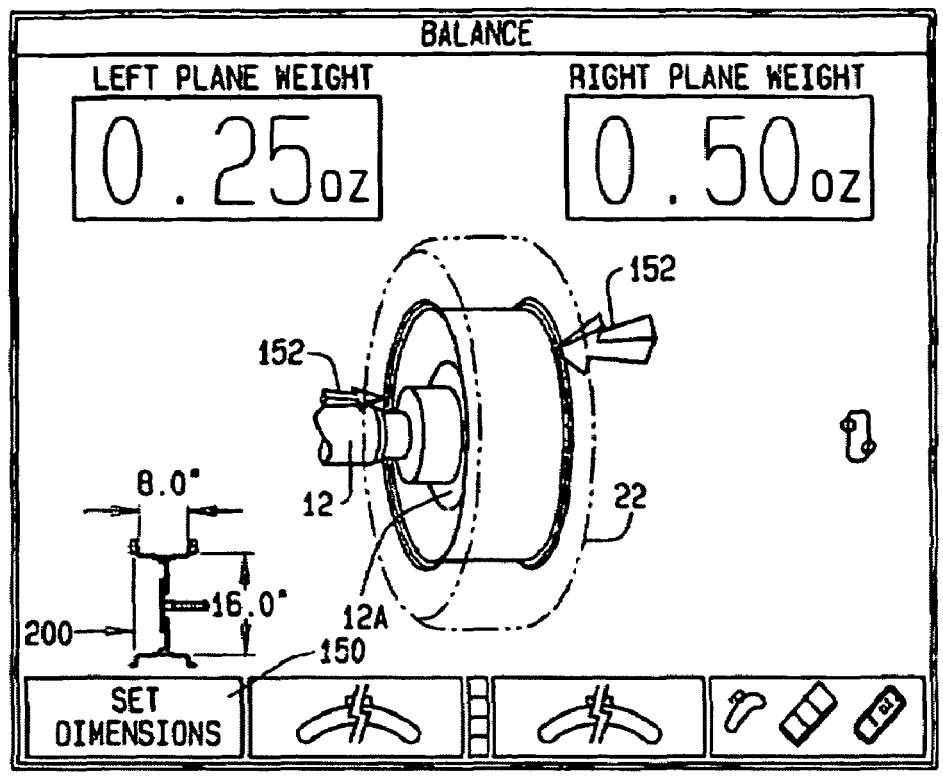
FIG. 6 is a representation of a prior art balancer display indicating required weight placement for a rotating body of specific dimensions.
Figure 7:
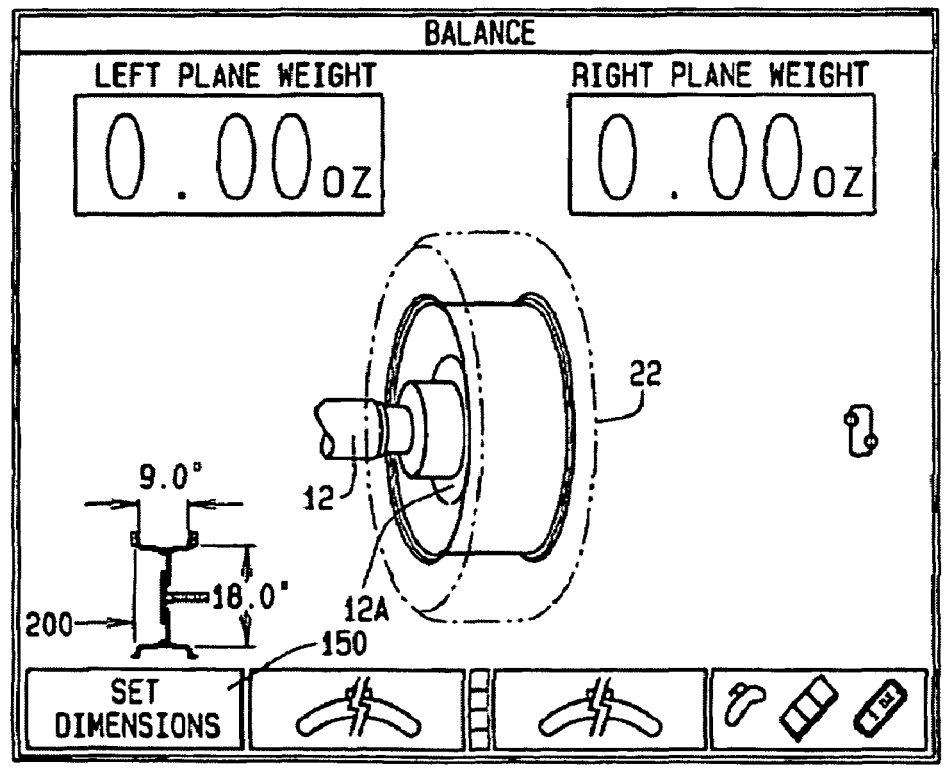
FIG. 7 is a representation of a prior art balancer display similar to FIG. 6, indicating no required weight placements for the rotating body with larger width (weight plane separation) dimensions but having the same imbalance.

A similar problem exists for conventional balancer systems when balancing large wheels. For example, as shown in FIG. 6, a wheel having an 8.0 inch axial width, and a 16.0 inch diameter might have an imbalance above the weight threshold, resulting in the balancer displaying to an operator that imbalance correction weights are required for both the left or right imbalance correction planes. However, as shown in FIG. 7, if the dimensions of the wheel are manually changed by the operator using button 150 to show an 18.0 inch diameter, without re-measuring the wheel imbalance, less weight is displayed to correct the imbalance, which drops below the weight threshold level. As a result, a conventional balancer would now indicate to an operator that no weights in the left and right imbalance correction planes are required, despite the fact that the amount of the imbalance is unchanged.

In an alternate embodiment of the present invention, the balancer 10 is provided with a reference value representative of the maximum imbalance effect which is permitted for each type of imbalance in the rotating body 22 to be corrected, i.e., $F_{max}$ for static imbalance and $M_{max}$ for dynamic imbalance. For example, the static imbalance force limit $F_{max}$ is provided to identify a static imbalance threshold, and a dynamic imbalance moment limit $M_{max}$ is provided to identify a dynamic imbalance threshold selected to correspond to levels of imbalance forces in the rotating body 22 which are imperceptible to the average consumer. For example, 2.18 oz.-in. for a static imbalance moment limit, corresponding to a 0.29 oz. weight on a 15" diameter wheel rim, and 15.0 oz.-in$^2$. for a dynamic imbalance limit which corresponds to approximately a 0.33 oz. weight on each plane of 6" wide, 15" diameter wheel rim, each separate by 180 degrees of rotation.

It may be desirable, however, to adjust these limits to favor either static imbalance or dynamic (couple) imbalance. For instance, it is understood that passengers in a vehicle are less sensitive to a dynamic (couple) imbalance than a static imbalance. The values for $F_{max}$ and $M_{max}$ may be programmed into the balancer 10 or selected as a function of the particular class of vehicle undergoing service (i.e. passenger vehicle, sport utility vehicle, light truck), as a function of the type of tire being balanced, or based upon a database of specific vehicle types and tire combinations. Vehicles with lower sensitivity to imbalance forces can tolerate a greater imbalance level in the tire assemblies without perception by the average consumer. For example, a way to reduce technician's labor with a minimal increase in vibration would be to increase the dynamic limit $M_{max}$ to 20.0 oz.-in.$^2$ for some types of rotating bodies 22.

Figure 17:
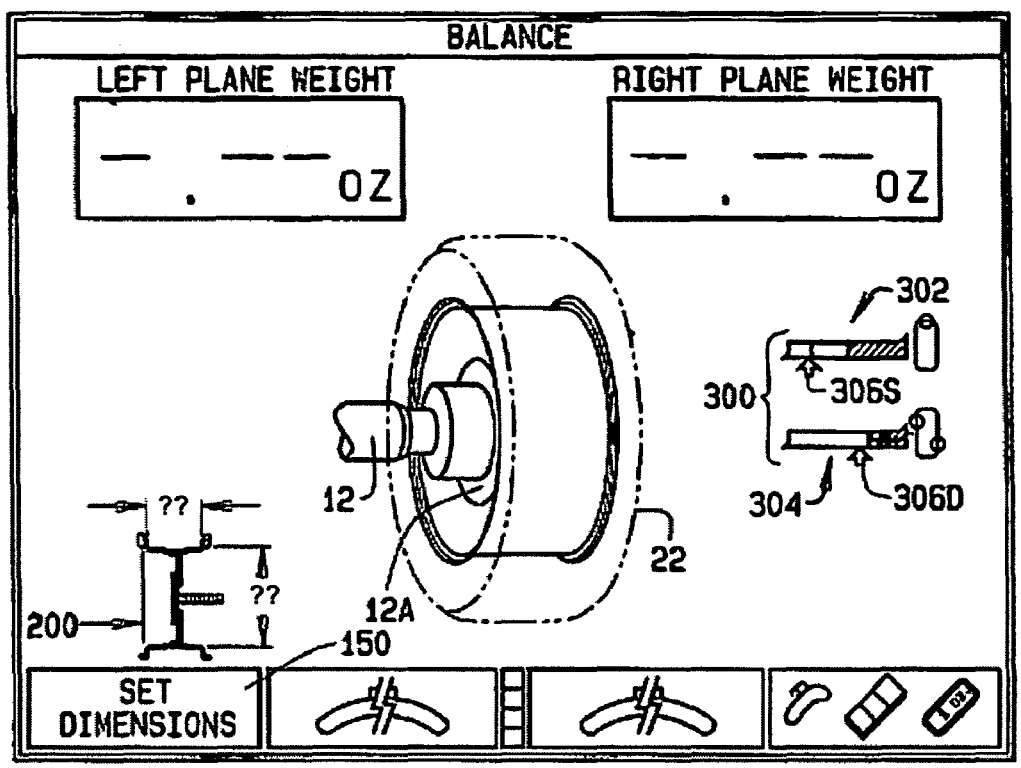
FIG. 17 is a representation of a display of the present invention showing a graphical presentation of the imbalance forces in the rotating body of unknown dimensions.
Figure 18:
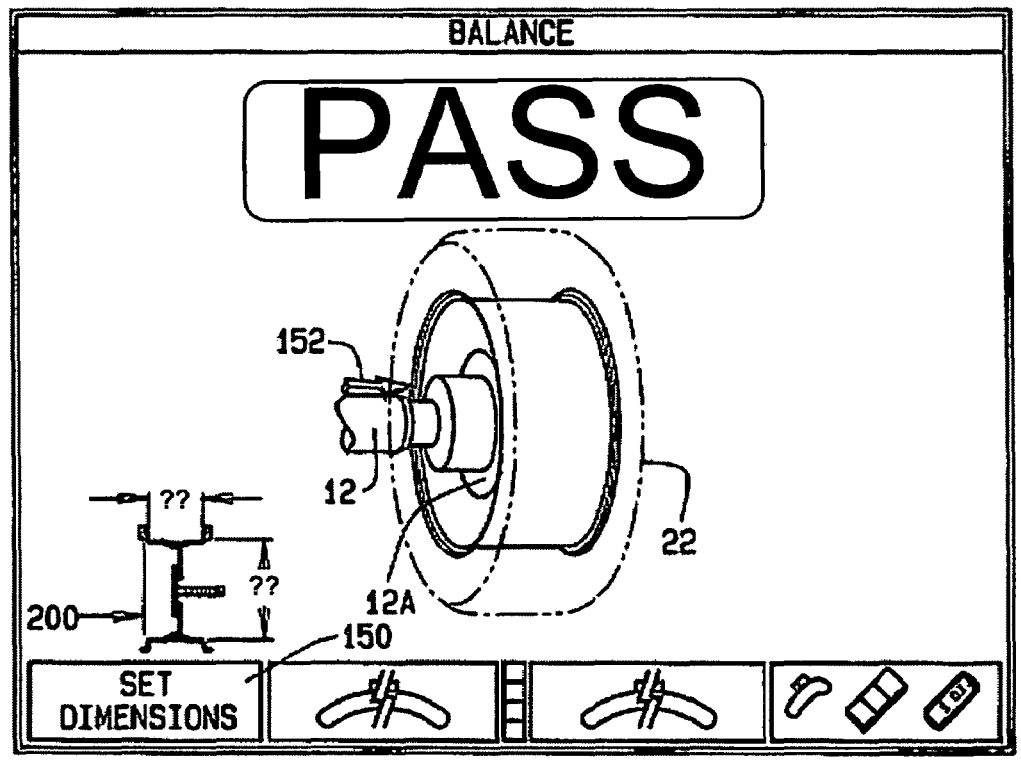
FIG. 18 is a representation of a display similar to FIG. 17, indicating a pass condition for a rotating body of unknown dimensions.

A balancer 10 of the present invention may be configured to acquire initial vector measurements of the static and couple imbalances of a rotating body 22, represented as S> and C>, prior to utilizing dimensional measurements of the rotating body 22 (i.e., such as a rotating body or vehicle wheel of unknown dimensions). The specific dimensional measurements of the rotating body, and the dimensional locations at which to place imbalance correction weights, are not utilized in an initial evaluation of the imbalance forces on the rotating body 22. The measured values for S> and C> are compared to reference imbalance component limits $F_{max}$ and $M_{max}$ to determine if the additional steps associated with the determination and placement of imbalance correction weights are required. If the imbalance forces present in the rotating body 22 are below the reference thresholds, they may optionally be displayed in a graphical representation, as shown in FIG. 17, and require no further corrective action, which may be indicated as a "passed" condition for the rotating body 22, such as shown in FIG. 18.

If the measured imbalance forces exceed the reference thresholds, the operator may be directed to proceed to a dimensional measurement step, after which appropriate imbalance correction weight amounts and applications locations are calculated and displayed in a conventional manner, but without the use of a conventional "blind" setting.

Alternatively, the vehicle wheel balancer 10 may be configured to compute imbalance correction weight amounts and placement locations for a rotating body 22 of unknown dimensions utilizing a set of reference dimensions, such as a 15" diameter and s 6" width, together with the measured imbalance forces present in the rotating body 22. The computed imbalance correction weight amounts are then compared by the balancer 10 with reference weight amounts associated with a rotating body having the reference dimensions, and a determination of acceptance based there on. For example, if the computed imbalance correction weight amounts are less than the reference weight amounts, the balancer 10 may be configured to indicate the rotating body as "passed", and not require any imbalance corrective action. Conversely, if the computed imbalance correction weight amounts exceed the reference weight amounts, the balancer 10 is configured to calculate corrective imbalance correction weight amounts and placement locations utilizing actual dimensions of the rotating body 22 undergoing balance testing.

The ability of a vehicle wheel balancer system 10 to evaluate the imbalance forces and/or imbalance correction weight amounts associated with a rotating body prior to a determination or measurement of the actual dimensions of the rotating body 22 provides an operator with a potentially significant time savings during a balancing operation. This may be useful for a variety of vehicle wheel balancer systems, including those employing non-contact wheel measurement systems such as ultrasonic measurement systems, laser-based measurement systems, or, machine vision measurement systems, which require a considerable amount of time to acquire the wheel dimensional measurements relative to the amount of time required to determine the imbalance forces present in the wheel.

An alternate embodiment of the variable correction weight threshold computation utilizes a comparison of selected imbalance correction weight plane locations to a set of reference imbalance correction weight plane locations, without requiring imbalance force measurements of the rotating body 22 or utilizing reference imbalance force limits $F_{max}$ or $M_{max}$. For example, the set of reference imbalance correction weight plane locations may correspond to the 15" diameter and 6" width dimensions previously described, associated with the "feel to the driver" equivalent imbalance force limits $F_{max}$ and $M_{max}$ caused by placing a 0.29 oz static weight and 0.33 oz of couple pair weights on a wheel.

The imbalance correction weight thresholds $W_{bs}$ and $W_{bd}$ are then determined as a change in "reference" weight threshold limits $W_{bs\_ref}$ and $W_{bd\_ref}$ as a function of the change in diameter and plane separation of the selected imbalance correction weight planes from the reference dimensions:

$$W_{bs}=W_{bs\_ref}*(D_{s\_ref}/D)\qquad\text{Equation (1)}$$

where: $W_{bs}$ represents the static weight threshold for the wheel under test; $W_{bs\_ref}$ represents the static weight threshold for the reference wheel (such as 0.29 oz); Ds represents the diameter of the static weight placement location of the wheel under test; and $D_{s\_ref}$ represents the diameter of the static weight placement location of reference wheel (such as 15").

$$W_{bd}=W_{bd\_ref}*(D_{d\_ref}/D_d)*(W\_ref/W)\qquad\text{Equation (2)}$$

where $W_{bd}$ represents the dynamic weight threshold for the wheel under test; $W_{bd\_ref}$ represents the dynamic weight threshold for a reference wheel (such as 0.33 oz); $D_d$ represents the diameter of the dynamic weight pair placement of the wheel under test; $D_{d\_ref}$ represents the diameter of the dynamic weight pair placement of reference wheel (such as 15"); W represents the plane separation of dynamic weights of the wheel under test; and $W\_ref$ represents the plane separation of the dynamic weights of reference wheel (such as 6").

For some rotating bodies 22, the inner and outer planes on which imbalance correction weights are to be placed could have different diameters, particularly when dealing with adhesive imbalance correction weights disposed on the inside of a wheel rim having an internal taper or steps along the profile. For this case, the value of $D_d$ utilized in Equation (2) is the average of the inner and outer plane diameters. Although this places the imagined "dynamic weight pair placement diameter" literally in mid air for the left plane and inside the wheel material for the right plane, it is only a temporary usage to compute the display threshold for the dynamic imbalance correction weight pair, and does not affect the accuracy of weight computations which utilize the actual inner and outer plane diameters as taught in U.S. Pat. No. 5,396,436.

Finally, the static and dynamic imbalance correction weight vectors which are above the respective variable thresholds $W_{bs}$ and $W_{bd}$ are vectorially combined, as is known in the art, to produce a displayed representation of the inner and outer imbalance correction weight vectors, simultaneously correcting the rotating body for both static and moment imbalances.

An alternate method is to compute the weights as taught in U.S. Pat. No. 5,396,436 from the static and moment imbalance vector components S> and C>, and weight placement dimensions A-AC, W, Ri, Ro; except if either one of the static or dynamic computed weight vectors is less than $W_{bs}$ or $W_{bd}$, respectively, the values for S> or C>, respectively are simply excluded from the weight computations.

A second alternate method is the case when the moment threshold $W_{bd}$ is exceeded is to apply the static imbalance correction even when $W_{bs}$ is not exceeded. Two imbalance correction weights will be applied to correct the couple imbalance in the rotating body, so this allows the final weight computation (which simultaneously corrects for both static and dynamic imbalance using the two imbalance correction weights) to possibly further reduce any static residual imbalance in the rotating body. The imbalance correction weights must be rounded to the nearest increment so the portion needed to correct the small static component may be included in the displayed imbalance correction weight values.

It may be desirable, to adjust these limits to favor either static imbalance or dynamic (couple) imbalance. For instance, it is understood that passengers in a vehicle are less sensitive to a dynamic (couple) imbalance than a static imbalance. The predetermined values for $W_{bs\_ref}$ and $W_{bd\_ref}$ may be programmed into the balancer 10 or selected as a function of the particular class of vehicle undergoing service (i.e. passenger vehicle, sport utility vehicle, light truck), as a function of the type of tire being balanced, or based upon a database of specific vehicle types and tire combinations. Vehicles with lower sensitivity to imbalance forces can tolerate a greater imbalance level in the tire assemblies without perception by the average consumer.

Figure 8:
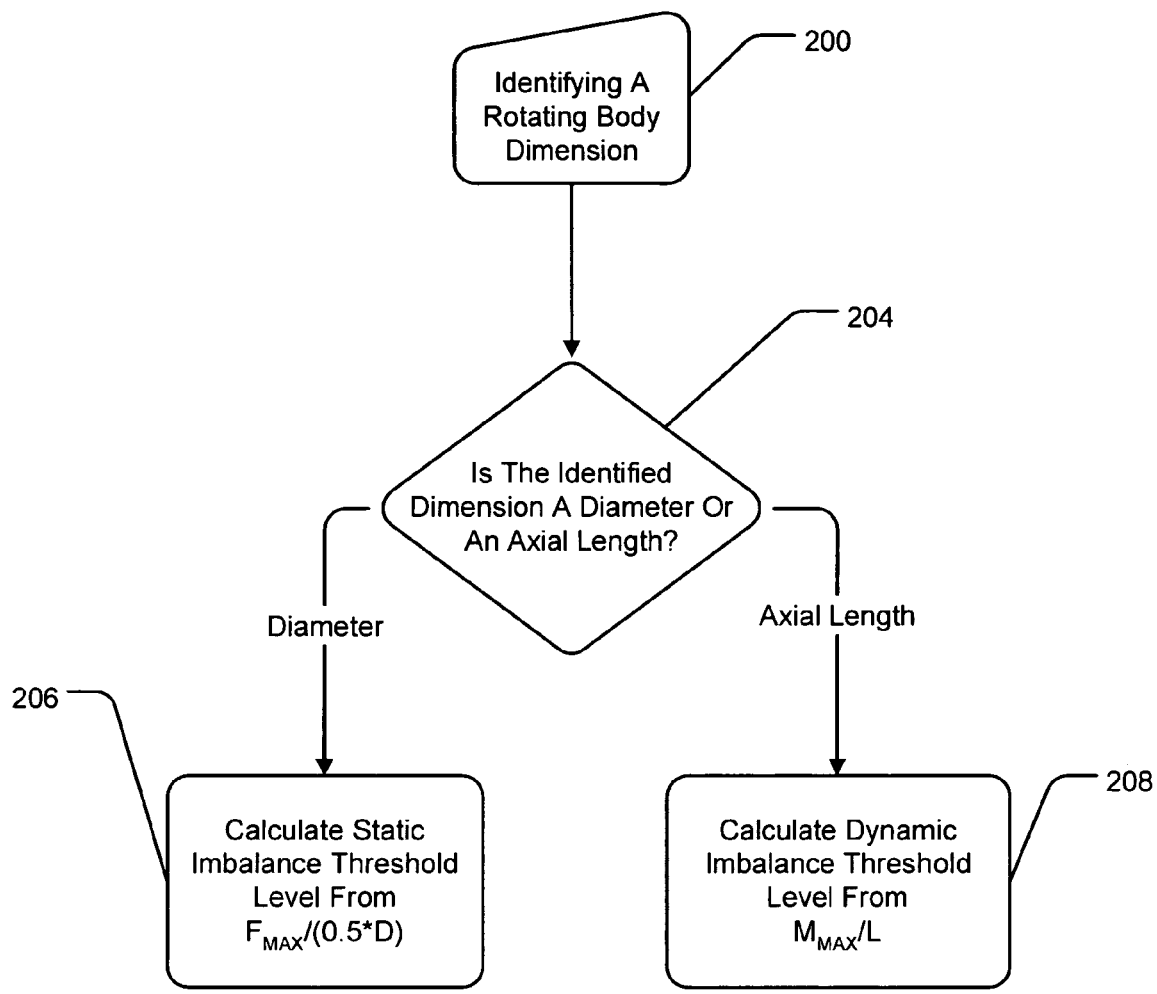
FIG. 8 is a flow chart diagram of a method of the present invention for displaying desired correction weights.

In an alternate embodiment of the present invention, shown in FIG. 8, a balancer 10 is configured to select an imbalance correction weight display threshold or "blind" based upon one or more dimensions of the rotating body 22 being balanced. These dimensions include the imbalance correction weight placement diameter and an imbalance correction weight placement separation distance. Preferably, these dimensions are measured directly by the balancer 10, such as by utilizing operator assistance to place a wheel dimension measurement device, such as a dataset arm, at the desired imbalance correction weight planes and/or at the edge of the rotating body 22, or by non-contact measurement means. Alternatively, when the diameter and width of a rotating body 22 are known, an operator can directly supply the balancer 10 with corresponding values using one or more manual inputs 34 (Box 200).

The balancer 10 is configured to utilize the predetermined value representative of the maximum imbalance effect permitted, together with the associated dimensions of the rotating body 22 to identify a variable imbalance correction threshold used to display, to an operator on display 30, as zero any imbalance which would require an imbalance correction weight value below the variable threshold. (Box 204).

For correcting static imbalances present in the rotating body 22 (Box 206), the predetermined static imbalance force limit is $F_{max}$ (typically in units of oz.-in.), the known or measured rotating body diameter is D, and the imbalance correction weight threshold or "blind" is $W_{BS}$. A variable threshold value for $W_{BS}$ is determined by the balancer 10 according to the following equation:

$$W_{BS} = F_{MAX}/(D/2) \qquad \text{Equation (3)}$$

For correcting dynamic imbalances present in the rotating body 22 (Box 208), the predetermined dynamic imbalance moment limit is $M_{max}$, (typically in units of oz.-in.$^2$) the known or measured rotating body axial length or axial width is W, and the imbalance correction weight threshold or "blind" is $W_{BD}$. If it is assumed that there is no static imbalance in the wheel, a variable threshold value for $W_{BD}$ is determined by the balancer 10 according to the following equation:

$$W_{BD} = M_{max}/W*(D/2) \qquad \text{Equation (4)}$$

For example, if the balancer 10 is configured with a predetermined static imbalance force limit ($F_{max}$) of 2.18 oz.-in. for correcting static imbalances present in the rotating body 22, and the rotating body 22 has a measured or known diameter of 15.0", solving Equation (3) above for $W_{BS}$ yields an imbalance correction weight threshold or "blind" of 0.29 oz. If the rotating body 22 has a measured or known diameter of 12.0", Equation (3) yields an imbalance correction weight threshold or "blind" of 0.36 oz. Correspondingly, if the rotating body 22 has a measured or known diameter of 20.0", Equation (3) yields an imbalance correction weight threshold or "blind" of 0.21 oz. for the same value of $F_{max}$.

The benefit offered by a balancer 10 configured to utilize the aforementioned methods to identify imbalance correction weight thresholds based in-part upon the known or measured dimensions of a rotating body 22 undergoing balancing can be clearly illustrated by the following comparisons.

When balancing a wheel assembly having a 15.0" diameter wheel rim with an axial width of 5.0", it is possible for a conventionally configured balancer to identify a static imbalance over the limit of 2.18 oz.-in. but a dynamic imbalance under the limit of 15 oz.-in.$^2$ and suggest a correction requiring two imbalance correction weights of 0.25 oz. and 0.75 oz., one to be placed on the inner lip of the wheel rim, and the other to be placed on the outer lip of the wheel rim. However, on a balancer 10 configured with a predetermined dynamic imbalance moment limit ($M_{max}$) of 15.0 oz.in$^2$, the dynamic imbalance is determined to have minimal effect on the vehicle and will be ignored and the remaining static imbalance can be corrected by a single 0.25 oz. weight.

By setting the imbalance threshold amounts based on the actual force and moment values, rather than displayed weight amounts, it is possible to minimize the residual imbalance in a wheel. A conventional balancer may measure a purely static imbalance that requires 0.50 oz. weight to correct. If the balancer is set to the "Dynamic" balance mode it will calculate that a 0.25 oz. weight is required on both the left and the right planes. Since the traditional threshold is set to 0.29 oz. the machine will show that no correction weights are required, but the wheel is not balanced. With the method of the present invention employed, the correct weights will be displayed and the wheel will be properly balanced. In the example described above, there is a small amount of couple imbalance present along with the static imbalance. Even though the amount of couple is small and no specific weights are required to correct it, it is possible to place the static correction weight in a location to possibly reduce the couple imbalance.

When correcting the static imbalance, the single static weight can be placed on either the inner plane, adjacent the balancer, or the outer plane, opposite the balancer. The inner plane is alternatively referred to as the left plane, when the wheel is mounted on the right side of a balancer, and the outer plane is alternatively referred to as the right plane for the same wheel placement. To choose the correct plane in which to place the single static weight, it is necessary to compare the phase of the dynamic imbalance vector to the phase of the static force vector. The static correction weight is placed on the plane that minimizes the residual dynamic imbalance, without the placement of additional couple imbalance correction weights.

This will correct the static imbalance (which was greater than the blind), and depending upon the difference between the couple and static imbalance phase, it will decrease the couple imbalance or leave it unchanged (couple imbalance was already acceptably low). Since the inner and outer plane couple imbalance phases are always 180 degrees apart, the static imbalance phase will never be more than 90 degrees away from one of the couple imbalance phases. If the difference between the static and one of the couple imbalance phases is small, there will be a significant improvement in couple imbalance. If the static imbalance phase is exactly 90 degrees between both couple imbalance phases, the couple imbalance will not change when the static correction weight is added. This can be accomplished by the following logic sequence:

Assume the balancer is in "Dynamic" mode, static imbalance is greater than blind, and couple imbalance is less than the predetermined blind. The following steps are taken to place a single weight that will correct the static imbalance while reducing (or not changing) the couple imbalance.

Let couple imbalance=0 and calculate the static correction weight.

Static weight magnitude=Static imbalance/radius

Static weight phase=Static imbalance phase+180 degrees.

To correct the static imbalance, this weight could be placed on either the inner plane or the outer plane.

If the difference between the static imbalance phase angle and the outer plane couple imbalance phase angle is less than 90 degrees, place the single static correction weight on the outer plane. Otherwise, place the weight on the inner plane.

If the balancer is in "Static" mode it is common that dimensions will only be entered for a single plane. With the present invention it is desirable to compare the dynamic imbalance to the dynamic threshold. If the dynamic imbalance exceeds the threshold it is desirable to provide an indicator to the operator of this condition. The indication may be in the form of blinking lights, alpha-numeric text, or in the form of a message. If the operator has entered dimensions for two planes the indicator may be in the form of a display of the weights required to correct the couple imbalance.

An alternate embodiment of the present invention for enabling the placement of a single imbalance correction weight predicts a residual couple imbalance remaining in the rotating body 22 after application of the single (static) imbalance correction weight to either just the inner or just the outer correction plane. The predicted residual moment vector is computed by vector subtracting the moment vector that would be caused from a static weight vector at a chosen correction plane from the measured moment imbalance vector. It is important to note that when the two weight correction planes are at different diameters on the rotating body 22, such as when at least one of the weights is an adhesive weight to be applied to an internal surface of a wheels, the magnitude of the static correction weight vector for the left plane placement will be different than for the right plane placement.

Subsequent to a determination that the rotating body 22 requires imbalance correction, weight plane locations are selected and the balancer 10 then determines if a single imbalance correction weight can be applied which will result in an acceptable residual dynamic imbalance $M_{max}$ in the rotating body 22 according to the following procedure:

First, the correction weight plane locations A-AC, W, Ri, and Ro are determined for the rotating body, where "A" represents the distance measured to the inner weight plane of the rotating body 22; "AC" represents the distance from a reference plane of A to the origin of the coordinate systems; "W" represents the width between the weight planes of the rotating body 22; "Ri" represents the radius of the inner weight position; and "Ro" represents the radius of the outer weight position, as described in U.S. Pat. No. 5,396,436 and herein incorporated by reference.

Next, compute a residual imbalance prediction "$C_{res\_i}$>" for only a static imbalance correction weight applied to the inner weight plane according to:

$$C_{res\_i}> = C> - ((S>/R_i)>*(A-AC)*R_i)> \qquad \text{Equation (5)}$$

where ">" denotes a vector, "C>" denotes a couple imbalance applied at the origin, and "S>" denotes static imbalance applied at the origin.

Similarly, compute a residual imbalance prediction "$C_{res\_o}$>" for only a static imbalance correction weight applied to the outer weight plane according to:

$$C_{res\_o}> = C> - ((S>/R_o)>*(A-AC+W)*R_o)> \qquad \text{Equation (6)}$$

Choose the lesser magnitude of $C_{res\_i}$> and $C_{res\_o}$> and if it is less than the predetermined dynamic imbalance moment limit or threshold $M_{max}$, the balancer 10 will direct the operator to apply the static imbalance correction weight on the corresponding weight plane, preferably by providing a display of the static imbalance correction weight amount on a display associated with the corresponding plane, and displaying a zero value for the other plane.

When utilizing a pair of equal clip-on imbalance correction weights at the inner and outer planes of the rotating body 22, Ro=Ri=D/2, the static weight is the same for each plane, and Equations (5) and (6) reduce to:

$$C_{res\_i}> = C> - ((S>/(D/2))>*(A-AC)*D/2)> \qquad \text{Equation (7)}$$

$$C_{res\_o}> = C> - ((S>/(D/2))>*(A-AC+W)*D/2)> \qquad \text{Equation (8)}$$

The single weight computations can be applied to favor one possible balance plane based on the style of imbalance correction weights utilized.

For inner and outer plane clip-on balancing, the balancer 10 may be optionally configured to avoid directing the operator to install a single imbalance correction weight on the outer plane when it is possible to place a single imbalance correction weight only on the inner plane and maintain the residual dynamic imbalance moment below the predetermined dynamic imbalance moment limit or threshold $M_{max}$. This option is particularly suited for applications where the rotating body 22 or wheel does not physically support the ability to place a clip-on imbalance correction weight on the outer plane or where a customer simply does not want an imbalance correction weight on the outside of a wheel for aesthetic reasons.

For mix-weights balancing where a clip-on imbalance correction weight is to be applied to the inner plane and an adhesive imbalance correction weight is to be applied to the outer plane, the balancer 10 may optionally be configured to favor the inner clip-on imbalance correction weight location for the static weight (providing the residual dynamic imbalance moment prediction is below $M_{max}$) even if placement of an imbalance correction weight at the adhesive location would result in less residual dynamic imbalance. This option is particularly suited due to the relative ease of applying a clip-on imbalance correction weight versus an adhesive imbalance correction weight; cost savings associated with a clip-on imbalance correction weight; and for some rotating body 22 application (i.e. wheels), brake calipers fit so close to the inside surfaces of some wheels that adhesive weights cannot be used in that area.

To aid an operator in determining if a rotating body 22 has been balanced to within a predetermined threshold for both static imbalance and dynamic imbalance, the balancer 10 in an alternate embodiment is configured to provide the operator with a graphical illustration 300 of the measured imbalances relative to the threshold level of absolute imbalances on display 30, i.e. the couple imbalance threshold and the static imbalance threshold. Conventionally, such as shown in U.S. Pat. No. 5,915,274 to Douglas, weights required to correct static and dynamic imbalances are displayed relative to a fixed weight amount threshold to an operator on a bar graph. The fixed weight amount is based on the incremental weight size and the vehicle wheel geometry. In contrast, the graphical illustration 300 of the present invention displays information to an operator based upon absolute imbalances, and not on the incremental weight sizes and vehicle wheel geometry.

Figure 13:
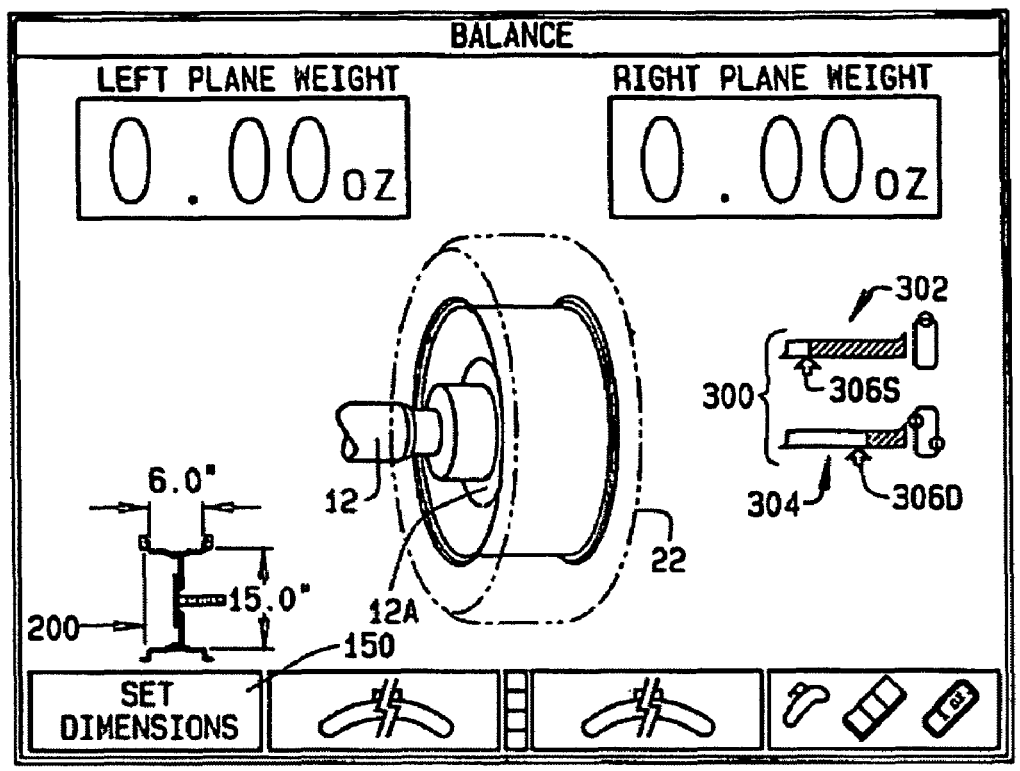
FIG. 13 is a representation of a display of the present invention showing a graphical presentation of the imbalance forces in the rotating body.
Figure 14:
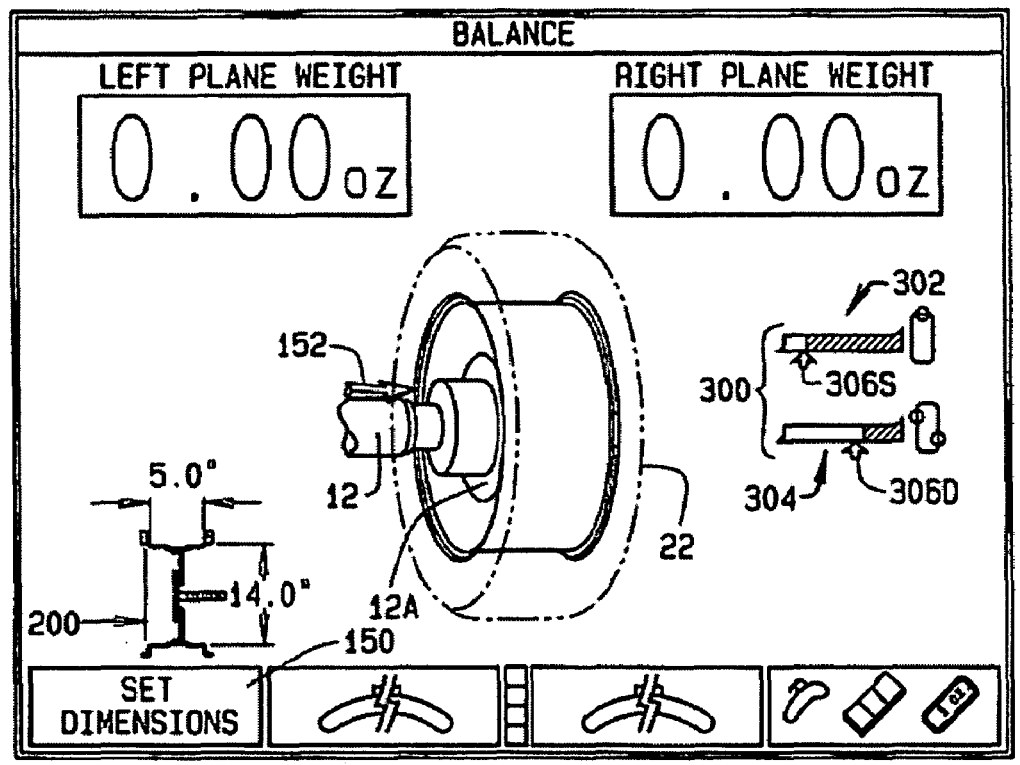
FIG. 14 is a representation of a display similar to FIG. 13, indicating that no additional weight is required on the wheel with a smaller diameter dimension and having the same imbalance.

Turning to FIGS. 13 and 14, a display 30 from a balancer 10 configured with the features of the present invention is shown first for a wheel having an axial length or width of 6.0 inches and a diameter of 15.0 inches. In this example, the imbalance present in the wheel for both static and dynamic imbalance is below a threshold level. This is illustrated with the graphical illustration 300, incorporating a sliding scale 302 for static imbalance, and a sliding scale 304 for dynamic imbalance. On each sliding scale 302 and 304, shown in FIG. 13, the computed imbalance amounts, as indicated by the arrows 306S and 306D, fall within the acceptable range, hence no imbalance correction weight amounts are indicated for the left and right correction planes. Further, as shown in FIG. 14, if the dimensions of the wheel are manually changed by the operator to indicate a 5.0 inch axial with and a 14.0 inch diameter, (corresponding to the change shown in FIG. 5) without re-measuring the imbalance, the measured imbalance in the wheel remains unchanged, as shown on the sliding scales 302 and 304. As a result, no imbalance correction weight amounts are indicated for the left and right correction planes.

Figure 15:
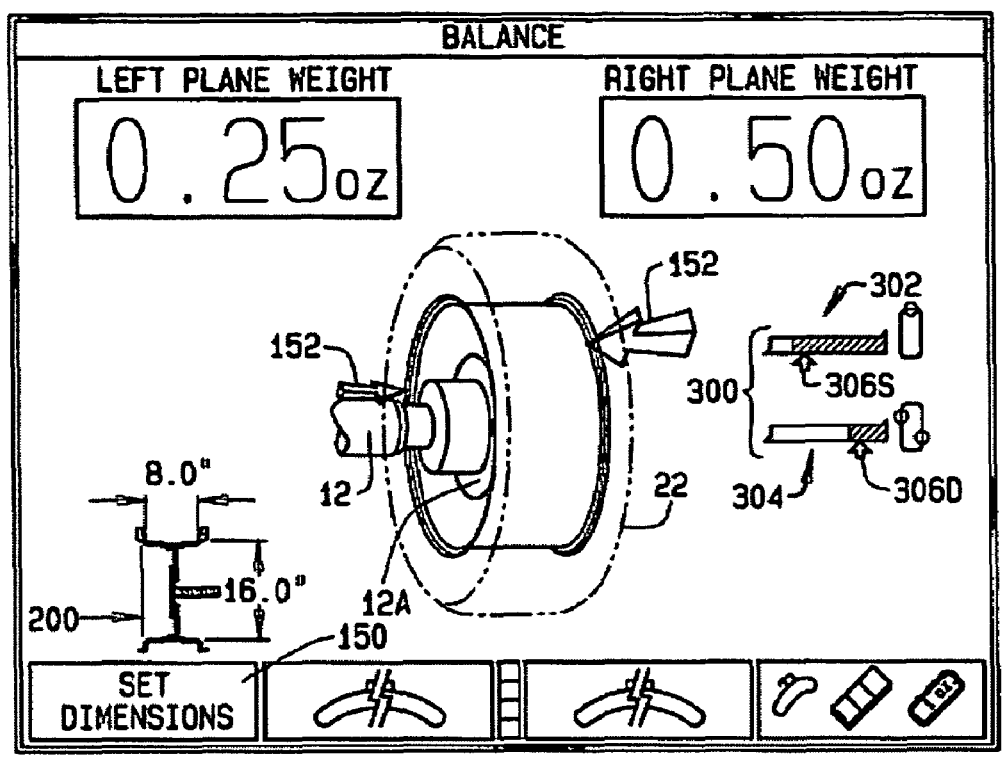
FIG. 15 is a representation of a display of the present invention showing a graphical presentation of the imbalance forces in the rotating body.
Figure 16:
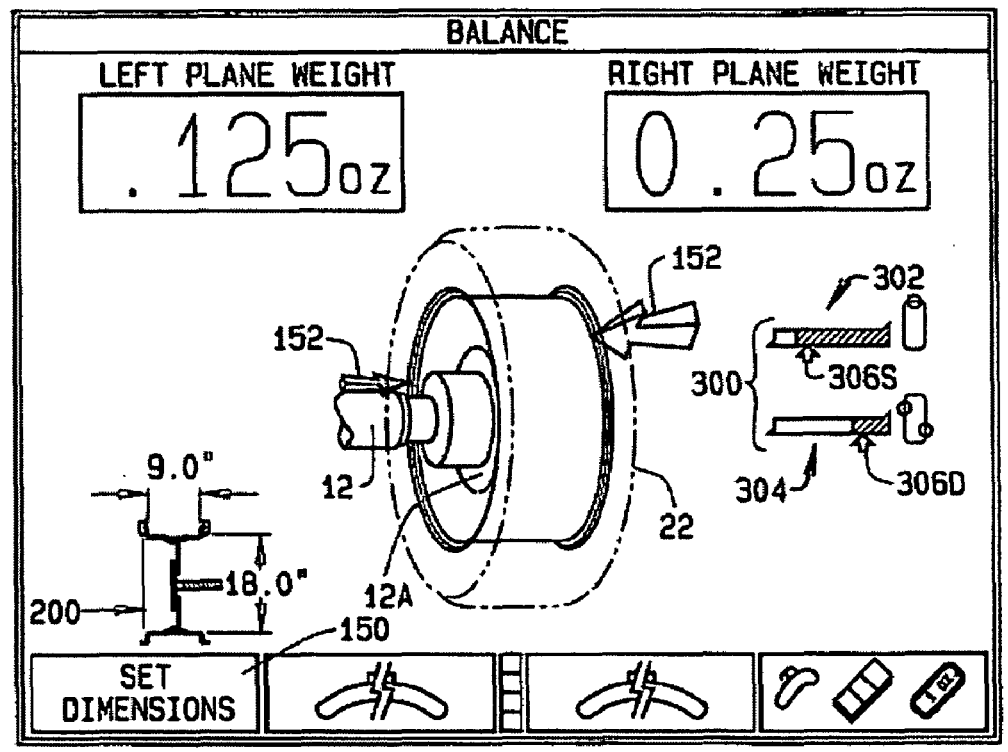
FIG. 16 is a representation of a display similar to FIG. 13, indicating that less weight is required on a wheel with larger width (weight plane separation) dimensions but having the same imbalance.

The method of the present invention provides a similar advantage when balancing large wheels. For example, as shown in FIG. 15, a wheel having a 8.0 inch axial width, and a 16.0 inch diameter might have an imbalance above the threshold, as shown on sliding scales 302 and 304, resulting in the balancer displaying to an operator imbalance correction weights required for both the left and right imbalance correction planes. However, as shown in FIG. 16, if the dimensions of the wheel are manually changed by the operator to show an 18.0 inch diameter, without re-measuring the imbalance, less weight is required to correct the same imbalance. As a result, the balancer indicates to an operator that reduced weights in the left and right imbalance correction planes are still required to correct the imbalance which is above the imbalance threshold.

It is known that a rotating body 22 static imbalance force is a function of the imbalance mass, the radial distance of the imbalance mass from the axis of rotation, and the angular velocity of the rotating body 22. In a vehicle wheel application, where the rotating body 22 consists of a wheel rim and tire assembly, for any given vehicle speed, the angular velocity may be expressed as a function of the tire diameter or as a function of the tire diameter and the wheel rim diameter. Hence, in an alternate embodiment of the present invention, the imbalance force F, experienced by a vehicle from a rotating wheel assembly may be defined as:

$$F = \frac{\left(\frac{v}{\pi D_T}\right)^2 m D_w}{2} \quad \text{Equation (9)}$$

where v is the vehicle velocity, $D_T$ is the tire diameter, $D_W$ is the correction weight application diameter, which is equal to the wheel diameter for clip-on weights, and m is the imbalance mass. For example, if an acceptable imbalance correction threshold or "blind" for a wheel rim having a diameter $D_{W0}$ of 15.0" with a tire having a diameter $D_{T0}$ of 28.0" is 0.29 oz. ($m_0$), an equation for calculating an equivalent "blind" ($m_1$) for an assembly with the dimensions $D_{W1}$ and $D_{T1}$ is:

$$m_1 = \frac{m_0 D_{W0}}{D_{W1}} \left(\frac{D_{T1}}{D_{T0}}\right)^2 \quad \text{Equation (10)}$$

Figure 9:
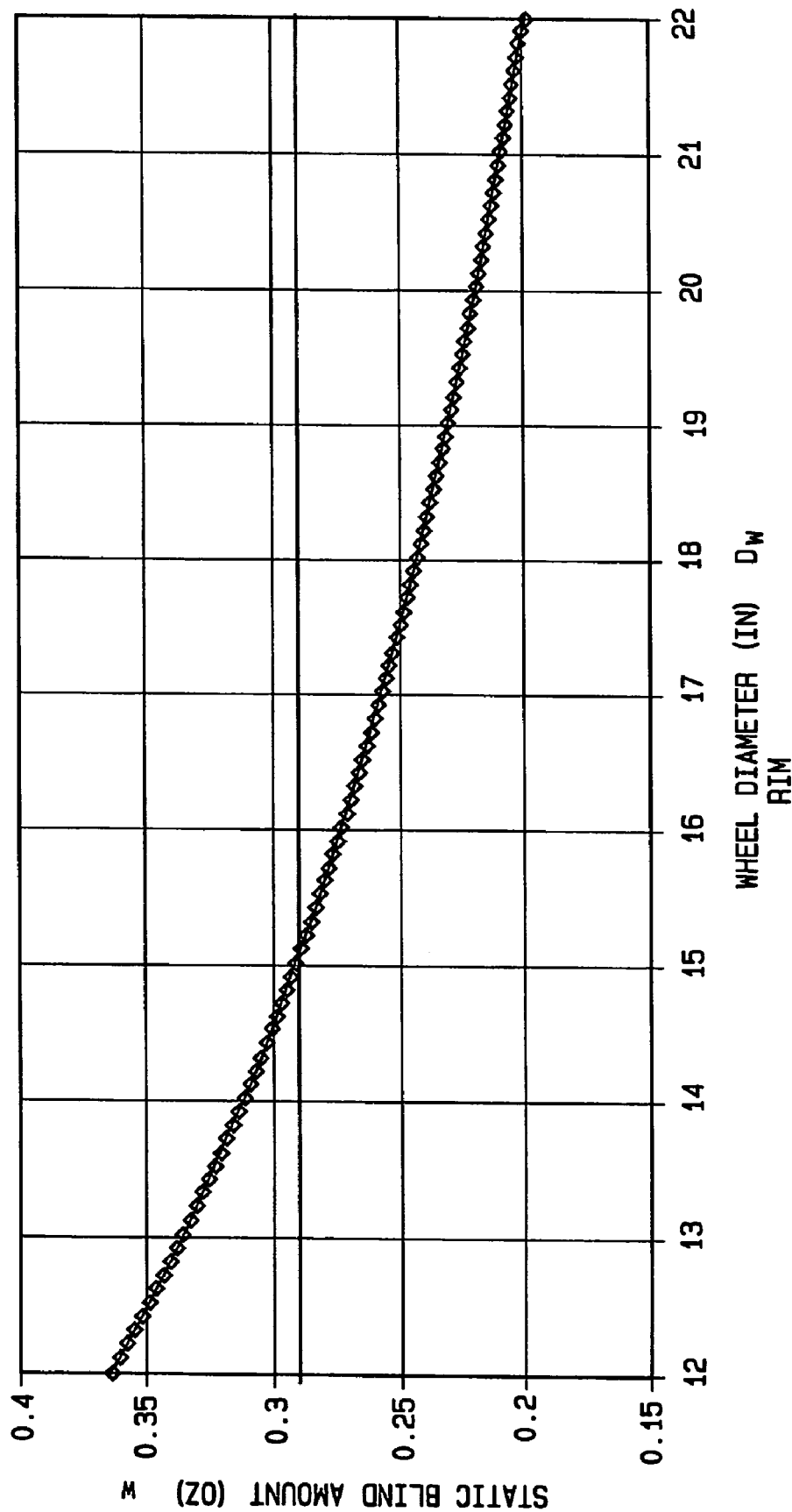
FIG. 9 is a two dimensional graphical representation of the blind amount versus wheel diameter for a predetermined static imbalance limit.
Figure 10:
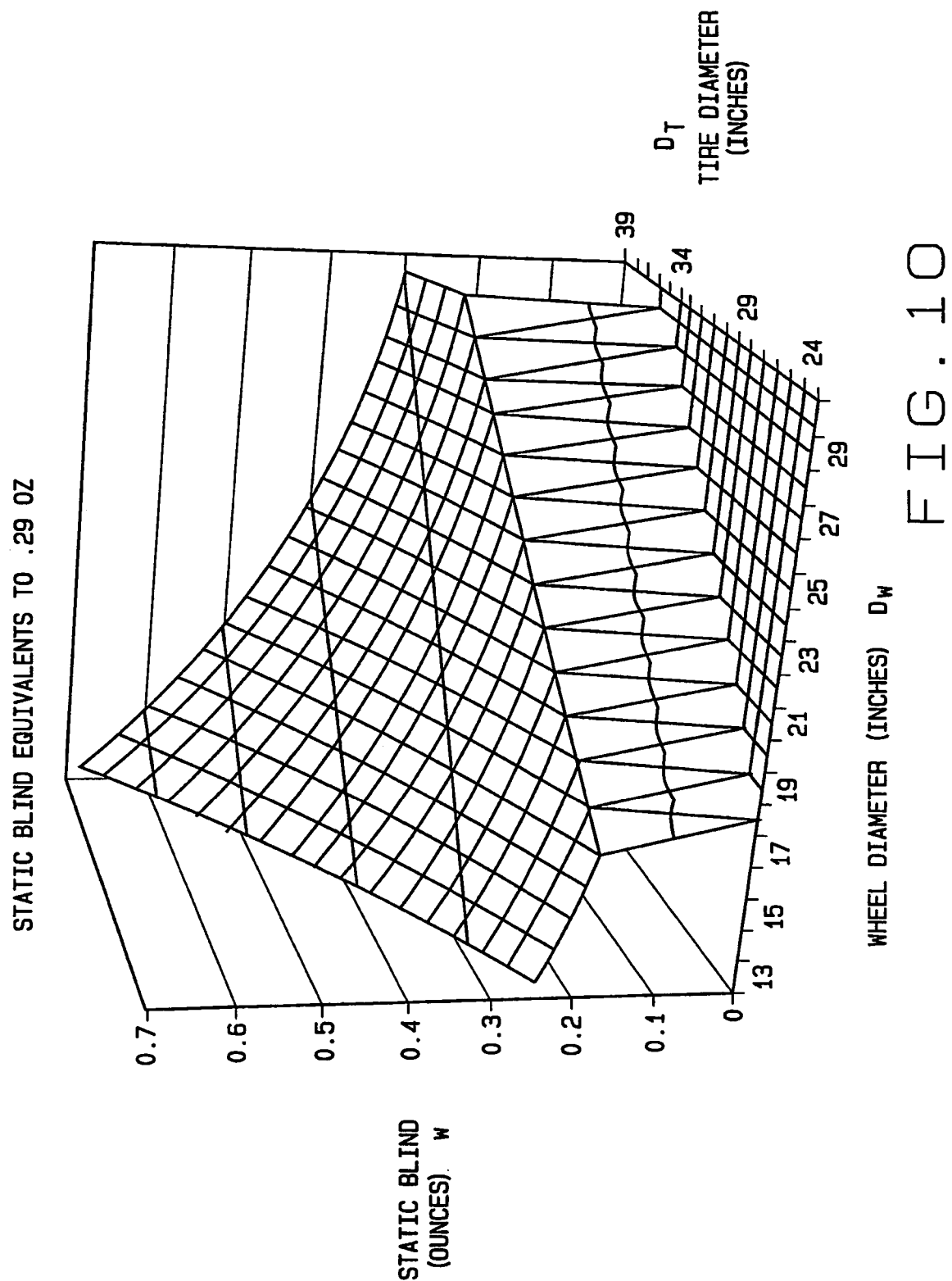
FIG. 10 is a surface plot representation of the blind amount compared with wheel diameter and tire diameter for a predetermined static imbalance limit.

Once an acceptable imbalance correction threshold or "blind" is established for a particular tire and rim combination, an equivalent imbalance correction threshold or "blind" may be automatically calculated using Equation (10) for a wide variety of wheel assemblies, providing an imbalance correction threshold curve, such as shown in FIG. 9 for wheel rim dimensions and in FIG. 10 for tire dimensions.

Utilizing the tire diameter $D_T$, and the wheel diameter $D_W$, wheel assemblies may be classified into predefined groupings. For example, performance wheel assemblies where $D_T$-$D_W$ is relatively small (~3.0 inches or less), touring wheel assemblies, where $D_T$-$D_W$ is between 3.0" and 5.0", and truck wheel assemblies, where $D_T$-$D_W$ is greater than 5.0". Each different predefined grouping may be provided with a different acceptable imbalance correction threshold or "blind" curve. Using Equation (10), the specific imbalance correction threshold or "blind" for a wheel assembly having specific dimensions may be automatically calculated, once a specific tire grouping and associated curve has been selected.

A similar analysis for the rotating body 22 couple imbalance force can be made. Where L is the wheel width, the imbalance couple (M) felt by the vehicle can be expressed as:

$$M = \left(\frac{v}{\pi D_T}\right)^2 w_L \frac{D_W}{2} \quad \text{Equation (11)}$$

If an acceptable imbalance correction threshold or "blind" for a wheel assembly having a 15×6 inch wheel rim ($D_{W0} \times L_0$), with a 28.0 inch diameter tire ($D_{T0}$) installed thereon is 0.29 oz ($w_0$) then using Equation (11), and equivalent blind ($w_1$) for an assembly with the dimension $D_{W1}$, $D_{T1}$, and $L_1$ is:

$$w_1 = \frac{w_0 D_{W0}}{D_{W1}} \left(\frac{D_{T1}}{D_{T0}}\right)^2 \frac{L_0}{L_1} \quad \text{Equation (12)}$$

Figure 11:
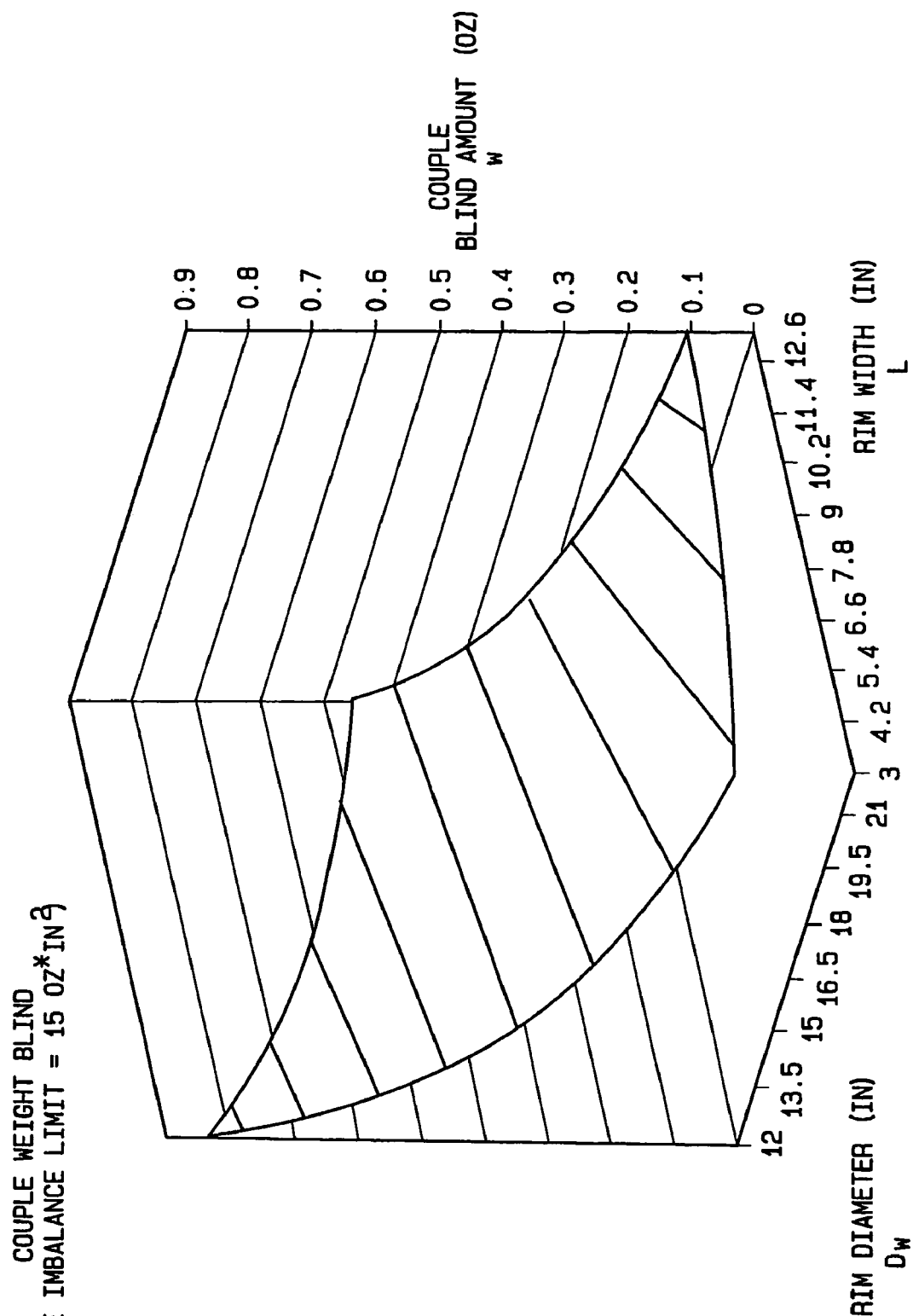
FIG. 11 is a surface plot representation of wheel rim diameter, wheel width, and couple blind amount for a predetermined couple imbalance limit.
Figure 12:
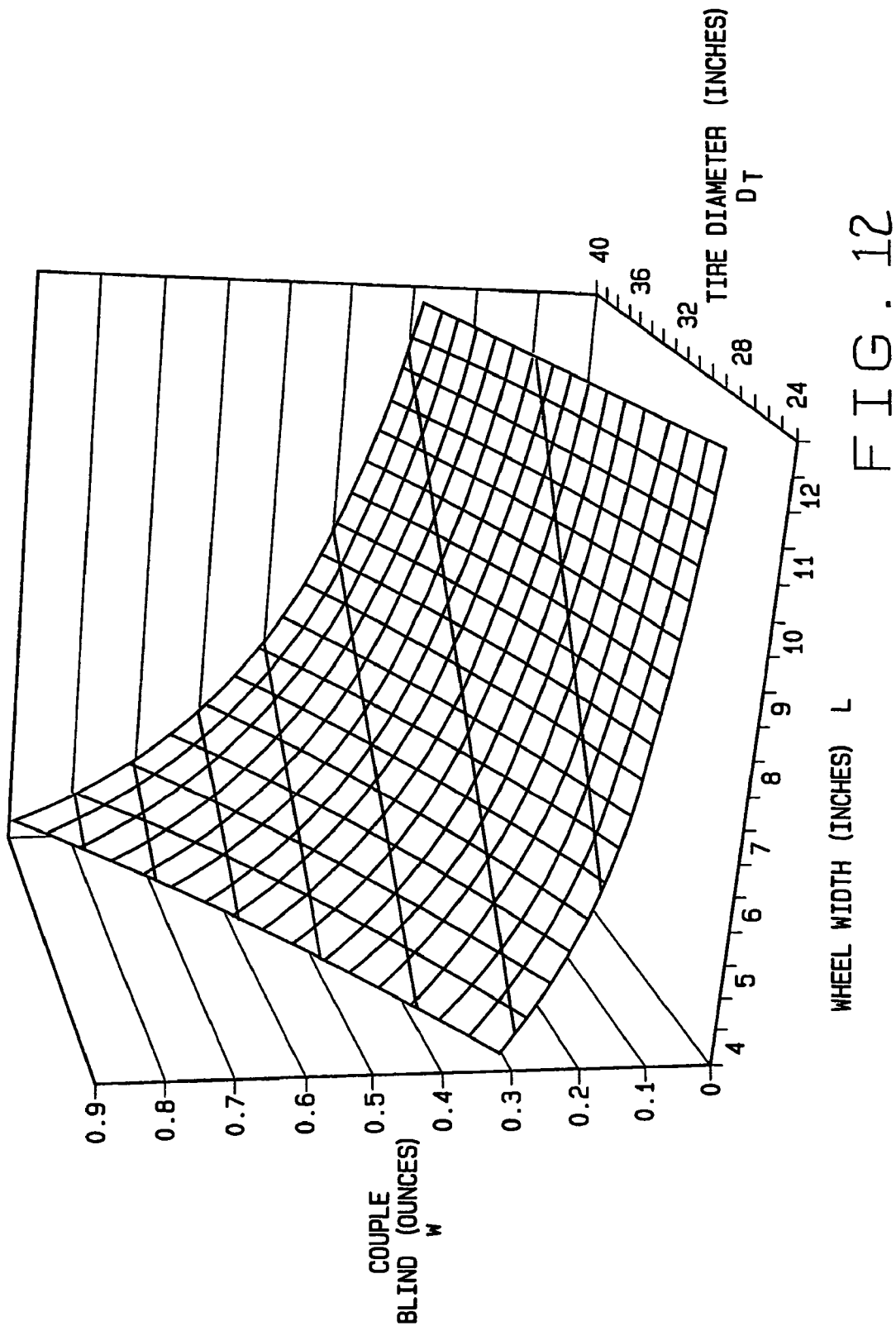
FIG. 12 is a surface plot similar to FIG. 11, for tire diameter, wheel width, and couple blind amount for a predetermined couple imbalance limit.

Once an acceptable couple imbalance correction weight threshold or "blind" is established for a particular tire and rim combination, an equivalent couple imbalance correction weight threshold or "blind" may be automatically calculated using Equation (12) for a wide variety of wheel assemblies, providing an couple imbalance correction weight threshold curve, such as shown in FIG. 11 for wheel rim dimensions and FIG. 12 for tire dimensions.

The present invention can be embodied in-part in the form of computer-implemented processes and apparatuses for practicing those processes. The present invention can also be embodied in-part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. method for evaluating an imbalance of a vehicle wheel, comprising:
   determining a measurement of an imbalance force associated with the vehicle wheel;
   comparing said determined imbalance force measurement with an associated imbalance force threshold representative of an acceptable imbalance force associated with said vehicle wheel; and
   providing a display of said determined imbalance force measurement in relation to said associated imbalance force threshold, said display further including a scaled representation of both said determined imbalance force measurement and said associated imbalance force threshold.

2. A method for evaluating an imbalance of a vehicle wheel, comprising:
   determining an imbalance force measurement associated with the vehicle wheel;

comparing said determined imbalance force measurement with an associated imbalance force threshold representative of an acceptable imbalance force associated with said vehicle wheel; and responsive to said comparison, determining from said determined imbalance force measurement and said associated imbalance force threshold, a need for a required imbalance correction.

3. The method of claim 2 further including the step of providing a display of said determined imbalance force measurement in relation to said associated imbalance force threshold.

4. The method of claim 2 wherein said imbalance force is a static imbalance force.

5. The method of claim 2 wherein said imbalance force is associated with a dynamic imbalance moment.

6. The method of claim 2 further including the step of indicating an acceptable imbalance condition associated with the vehicle wheel responsive to said comparison indicating said determined imbalance force measurement being less than said associated imbalance force threshold.

7. The method of claim 2 wherein, responsive to said comparison indicating said determined imbalance force measurement exceeds said associated imbalance force threshold, further including the steps of acquiring at least one dimension of said vehicle wheel; and determining at least one imbalance correction weight amount and placement location on said vehicle wheel.

8. The method of claim 2 further including the steps of:
identifying at least one dimension of the vehicle wheel;
representing said associated imbalance force threshold as an imbalance correction weight threshold corresponding to said at least one identified dimension utilizing a reference imbalance correction weight threshold associated with at least one reference dimension as a function of a difference between said identified at least one dimension and said at least one reference dimension.

9. The method of claim 8 wherein said step of identifying at least one dimension includes identifying a diameter of the vehicle wheel; and
wherein the step of calculating includes utilizing said identified diameter and a reference static imbalance correction weight threshold associated with a reference diameter.

10. The method of claim 8 wherein said step of identifying at least one dimension includes identifying a diameter and a plane separation distance for placing correction weights on the vehicle wheel; and
wherein said step of calculating includes utilizing said identified diameter, said identified plane separation distance, and a dynamic imbalance correction weight threshold associated with a reference diameter and a reference plane separation distance.

11. A method for evaluating an imbalance of a vehicle wheel, comprising:
determining a measurement of an imbalance force associated with the vehicle wheel;
comparing said determined imbalance force measurement with an associated imbalance force threshold;
wherein said associated imbalance force threshold is selected as a function of at least a class of vehicle or of a tire type associated with the vehicle; and
responsive to said comparison, determining from said determined imbalance force measurement and said associated imbalance force threshold, a need for a required imbalance correction.

12. The method of claim 11 wherein said imbalance force is associated with a dynamic imbalance moment.

13. A method for evaluating an imbalance of a vehicle wheel, comprising:
determining a measurement of an imbalance force associated with the vehicle wheel;
comparing said determined imbalance force measurement with an associated imbalance force threshold;
wherein said associated imbalance force threshold is selected from a database of vehicles.

14. The method of claim 13 wherein said imbalance force is associated with a dynamic imbalance moment.

15. A method for evaluating a vehicle wheel imbalance, comprising:
determining a measurement of an imbalance force associated with the vehicle wheel;
identifying a diameter of the vehicle wheel;
comparing said determined imbalance force measurement with an imbalance force threshold;
wherein said imbalance force threshold is represented as a calculated static imbalance correction weight threshold corresponding to said identified diameter of the vehicle wheel by utilizing a reference static imbalance correction weight threshold associated with a vehicle wheel reference diameter adjusted as a function of said identified diameter and said reference diameter, according to the equation $$W_{bs} = W_{bs\_ref} \times \left(\frac{D_{s\_ref}}{D_s}\right)$$

where
$W_{bs}$ is the calculated static imbalance correction weight threshold,
$D_s$ is the identified diameter of the vehicle wheel,
$D_{s\_ref}$ is the reference diameter, and
$W_{bs\_ref}$ is the reference static imbalance correction weight threshold.

16. A method for evaluating a vehicle wheel imbalance, comprising:
determining a measurement of an imbalance force associated with the vehicle wheel;
identifying a diameter and a plane separation distance for placing correction weights on the vehicle wheel;
comparing said determined imbalance force measurement with an associated imbalance force threshold which is represented as a calculated dynamic imbalance correction weight threshold, said comparison utilizing said identified diameter, said identified plane separation distance, and a dynamic imbalance correction weight threshold associated with a reference diameter and a reference plane separation distance to solve the equation $$W_{bd} = W_{bd\_ref} \times \left(\frac{D_{d\_ref}}{D_d}\right) \times \left(\frac{W_{\_ref}}{W}\right)$$

where
$W_{bd}$ is the calculated dynamic imbalance correction weight threshold,
$W_{bd\_ref}$ is said reference dynamic imbalance correction weight threshold,
$D_d$ is said identified diameter of the vehicle wheel,
$D_{d\_ref}$ is said reference diameter,
$W$ is said identified plane separation distance, and
$W_{\_ref}$ is said reference plane separation distance.

17. The method of claim 16 wherein said identified diameter of the vehicle wheel is an average of an inner plane diameter and an outer plane diameter for said vehicle wheel.

18. An improved vehicle wheel balancer system having a central processing unit processor and a plurality of imbalance sensors configured for measuring at least one imbalance force associated with a vehicle wheel having unknown dimensions, the improvement comprising:

wherein the central processing unit is operatively coupled to the plurality of imbalance sensors to determine at least one measurement of an imbalance force associated with the vehicle wheel of unknown dimensions; and wherein the central processing unit is further configure with operating instructions to compare said determined at least one imbalance force measurement with an imbalance force threshold representative of an acceptable imbalance associated with said vehicle wheel to determine a need for a required imbalance correction prior to determination of any vehicle wheel dimensions, and to indicate an acceptable imbalance condition associated with the vehicle wheel responsive to said comparison identifying said determined imbalance force measurement as being less than said imbalance force threshold.

19. The improved vehicle wheel balancer system of claim 18 further including a wheel dimensional measurement means for measuring at least one dimension of the vehicle wheel, said wheel dimensional measurement means operatively coupled to the central processing unit; and wherein the central processing unit is further configured with operating instructions to determine at least one imbalance correction weight amount and placement location on said vehicle wheel responsive to said determined imbalance force measurement exceeding said imbalance force threshold.

20. The method of claim 18 wherein said imbalance force is associated with a dynamic imbalance moment.

21. An improved vehicle wheel balancer system having a central processing unit processor and a plurality of imbalance sensors configured for measuring at least one imbalance force associated with a vehicle wheel having unknown dimensions, the improvement comprising:

wherein the central processing unit is operatively coupled to the plurality of imbalance sensors to determine at least one measurement of an imbalance force associated with the vehicle wheel of unknown dimensions;

wherein the central processing unit is configured with operating instructions to compare said determined at least one imbalance force measurement with an imbalance force threshold;

wherein the central processing unit is configured with operating instructions to respond to an outcome of said comparison by determining from said determined imbalance force measurement and said associated imbalance force threshold, a need for a required imbalance correction; and wherein the central processing unit is configured to select said imbalance force threshold as a function of at least a class of vehicle or of a tire type associated with the vehicle wheel.

22. An improved vehicle wheel balancer system having a central processing unit processor and a plurality of imbalance sensors configured for measuring at least one imbalance force associated with a vehicle wheel having unknown dimensions, the improvement comprising:

wherein the central processing unit is operatively coupled to the plurality of imbalance sensors to determine at least one measurement of an imbalance force associated with the vehicle wheel of unknown dimensions;

wherein the central processing unit is configured with operating instructions to compare said determined at least one imbalance force measurement with an imbalance force threshold;

wherein the central processing unit is further configured to select said imbalance force threshold utilizing a plurality of threshold values associated with vehicle or tire types; and wherein the central processing unit is further responsive to said comparison to determine a need for a required imbalance correction from said at least one imbalance force measurement and said imbalance force threshold.

23. A method for balancing a vehicle wheel, comprising:

measuring at least one imbalance force associated with the vehicle wheel;

calculating an imbalance correction weight amount utilizing said measured at least one imbalance force and a set of predetermined reference dimensions not associated with said vehicle wheel; and comparing said calculated imbalance correction weight amount to an imbalance correction weight threshold associated with said reference dimensions to determine an acceptability of imbalance present in said wheel undergoing balancing.

24. The method of claim 23 wherein said set of reference dimensions are associated with a reference vehicle wheel.

25. The method of claim 22 further including the step of indicating acceptability of the vehicle wheel responsive to said comparison identifying said calculated imbalance correction weight amount as being less than said imbalance correction weight threshold.

26. The method of claim 23 further including the steps of:

utilizing a set of dimensions associated with the vehicle wheel; and calculating an imbalance correction weight amount utilizing said measured at least one imbalance force and said set of dimensions associated with the vehicle wheel.

27. The method of claim 18 wherein said imbalance force is associated with a dynamic imbalance moment.

28. A method for evaluating an imbalance of a vehicle wheel, comprising:

determining an imbalance characteristic associated with the vehicle wheel, said imbalance characteristic defined as a correction weight amount corresponding to a measured imbalance force applied to a reference wheel having a set of reference dimensions;

comparing said imbalance characteristic with an associated imbalance force threshold representative of an acceptable imbalance associated with said vehicle wheel, wherein said associated imbalance force threshold is expressed as an imbalance correction weight threshold associated with said reference wheel having said reference dimensions; and responsive to said comparison, determining from said determined imbalance characteristic and said associated imbalance force threshold, a need for a required imbalance correction.

* * * * *

UNITED STATES PATENT AND TRADEMARK OFFICE
CERTIFICATE OF CORRECTION

PATENT NO. : 7,594,436 B2 Page 1 of 1
APPLICATION NO. : 11/127386
DATED : September 29, 2009
INVENTOR(S) : Gerdes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 514 days.

Signed and Sealed this

Twenty-eighth Day of September, 2010

David J. Kappos
*Director of the United States Patent and Trademark Office*